United States Patent
Linker

(10) Patent No.: US 7,252,305 B2
(45) Date of Patent: Aug. 7, 2007

(54) BASKET ASSEMBLY FOR A GOLF BAG CART

(76) Inventor: Harold F. Linker, P.O. Box 14418, Albuquerque, NM (US) 87191

( * ) Notice: Subject to any disclaimer, the term of this patent is extended or adjusted under 35 U.S.C. 154(b) by 278 days.

(21) Appl. No.: 11/102,780

(22) Filed: Apr. 11, 2005

(65) Prior Publication Data
US 2006/0226187 A1    Oct. 12, 2006

(51) Int. Cl.
*B60R 9/06* (2006.01)
(52) U.S. Cl. ................................ 280/769; 224/274
(58) Field of Classification Search ........ 280/33.991, 280/33.992, DIG. 5, DIG. 6, 769; 224/274, 224/419, 411–413, 433, 434, 430, 431, 425
See application file for complete search history.

(56) References Cited

U.S. PATENT DOCUMENTS

| | | | |
|---|---|---|---|
| 1,364,053 A | 12/1920 | Quintin | |
| 3,119,533 A * | 1/1964 | Kimes et al. | 224/274 |
| 3,603,549 A * | 9/1971 | Brilando et al. | 248/229.14 |
| 3,893,532 A * | 7/1975 | Perlowin | 180/19.1 |
| 4,190,224 A | 2/1980 | LeBlanc et al. | |
| 4,711,422 A | 12/1987 | Ibanez | |
| 5,332,134 A | 7/1994 | Chen | |
| 5,597,148 A | 1/1997 | Gospodarich | |
| 6,059,300 A * | 5/2000 | Wu | 280/47.2 |
| 6,079,600 A | 6/2000 | Linker et al. | |
| 6,425,562 B1 * | 7/2002 | Knudson | 248/230.1 |
| 6,439,522 B1 | 8/2002 | Yen | |
| 6,554,307 B1 | 4/2003 | Ockenden | |
| 2005/0200101 A1 * | 9/2005 | Chang | 280/651 |
| 2006/0226187 A1 * | 10/2006 | Linker | 224/274 |

* cited by examiner

*Primary Examiner*—Christopher P. Ellis
*Assistant Examiner*—Vaughn Coolman
(74) *Attorney, Agent, or Firm*—Stephen R. Greiner

(57) ABSTRACT

A basket assembly for a three-wheel pushcart having a leg brace includes a clamp for attachment to the brace. The clamp has a block with a notch for receiving the top of the brace. The block has bore extending from its top to its bottom and opening into the notch and another bore extending from one side of the block to the other. A clamping plate, for engagement with the bottom of the brace, is secured to the block by a first threaded fastener passing through the bore. A basket is releasably attached to a supporting bracket attached to the clamp and has an openwork box adapted for support by forwardly facing hooks at the bottom of a lower segment of laterally spaced members of the supporting bracket. A second threaded fastener extends through each apertured flange and the other bore to attach the bracket to the clamp.

3 Claims, 2 Drawing Sheets

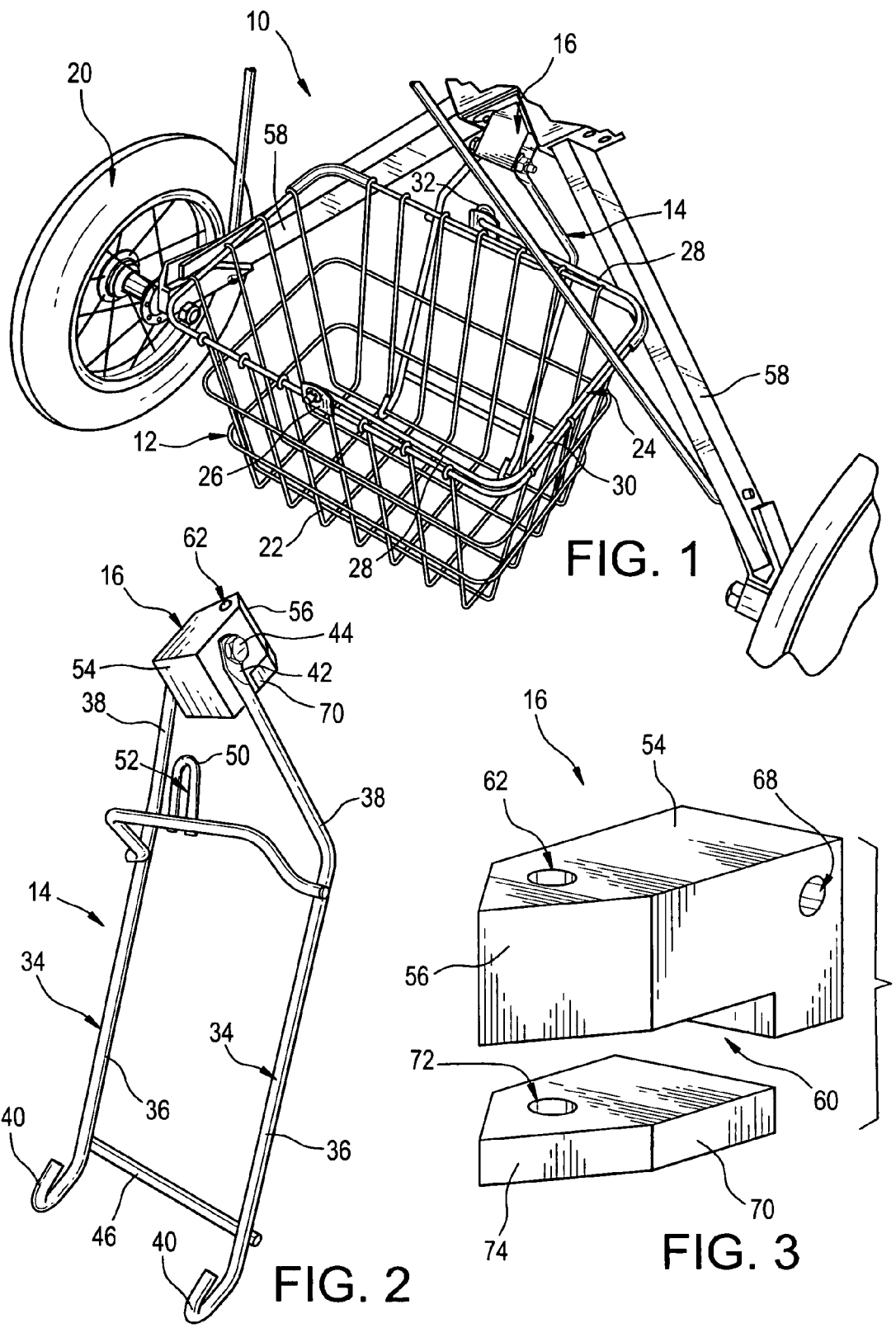

BASKET ASSEMBLY FOR A GOLF BAG CART

FIELD OF THE INVENTION

The present invention relates generally to vehicle-attached, article carriers and, in particular, to means for mounting such a carrier to a golf bag cart.

BACKGROUND OF THE INVENTION

As was noted in my previous patent, U.S. Pat. No. 6,079,600, carts have long been used by golfers to tote their club-filled bags while golfing. However, transporting other necessaries like food, drinks, jackets, gloves and hats has always been difficult. One cart manufacturer, Sun Mountain Sports, sells a zippered, fabric pouch for toting a few, small items that attaches to its three-wheel pushcarts. When desired, Sun Mountain's pouch can be detached from a cart and carried away by means of a built-in handle. Sadly, the pouch cannot transport bulky items that golfers normally carry.

In the '600 patent, I disclosed an assembly with a basket that can be sturdily mounted upon a motorized cart or "motorcaddy" to transport a variety of large items yet can be quickly and easily detached when a user desires. The detached basket can be carried by a golfer into his home, garage, locker room, or automobile for loading or unloading. It is presently believed that golfers that utilize three-wheel pushcarts such as those marketed by Sun Mountain would find the basket assembly that was developed for use with motorcaddies desirable. Unfortunately, the means originally developed for mounting basket assembly on a motorcaddy are not adequate for mounting the assembly on a three-wheel pushcart.

SUMMARY OF THE INVENTION

In light of the problems associated with transporting necessaries on a golf course, it is a principal object of the invention to provide a basket that can be sturdily mounted upon a three-wheel pushcart such as Sun Mountain Sports' "Speed Cart" yet can be quickly and easily detached when necessary. The detached basket may be carried by a golfer into his home, garage, locker room, or automobile for loading or unloading a large variety of items.

It is another object of the invention to provide a basket assembly that can be readily incorporated into a three-wheel pushcart at the time of its construction or added to it as an aftermarket product.

It is a further object of the invention to provide a basket assembly that can be mounted on a three-wheel pushcart by one with minimal mechanical aptitude, minimal instruction and few tools. Mounting is accomplished without modifying, removing, replacing any of the original cart components. After mounting, the assembly does not interfere with the functioning of the cart and even permits the cart to collapse in its normal manner for convenient storage and transport.

It is still another object of the invention to provide a basket assembly for a three-wheel pushcart that maintains the cart's low center of gravity during use so that the cart cannot tip over when the assembly is carrying a load.

It is an object of the invention to provide improved elements and arrangements thereof in a basket assembly for the purposes described which is lightweight in construction, inexpensive to manufacture, and dependable in use.

Briefly, the basket assembly in accordance with this invention achieves the intended objects by featuring a basket that is releasably connected to a supporting bracket affixed by a clamp to the horizontal leg brace of a cart. The clamp has a block with a tapered rear end and a notch for receiving the top of the brace. The block also has a first bore extending vertically through the tapered rear end and opening into the notch and a second bore extending horizontally through the front end of the block. A clamping plate, for engagement with the bottom of the leg brace, is secured to the block by a first threaded fastener passing through the vertical bore. A supporting bracket is attached to the clamp and has a pair of laterally spaced members, each with a forwardly facing hook at its bottom and an apertured flange at its top. A second threaded fastener extends through each apertured flange and the horizontal bore in the block to attach the bracket to the clamp. A cross brace extends between the laterally spaced members and carries a locking member with a slot. A basket is releasably attached to the supporting bracket and has an openwork box for support by the bracket hooks. A handle is pivotally connected to the box and has an L-shaped end that can be moved through the slot of the locking member when the handle is oriented in a first position. Pivoting the handle to a second position pivots the L-shaped end to prevent its withdrawal from the slot and selectively locks the basket upon the supporting bracket.

The foregoing and other objects, features and advantages of the present invention will become readily apparent upon further review of the following detailed description of the preferred embodiments as illustrated in the accompanying drawings.

BRIEF DESCRIPTION OF THE DRAWINGS

The present invention may be more readily described with reference to the accompanying drawings, in which:

FIG. 1 is a perspective view of a basket assembly in accordance with the present invention mounted on the bottom portion of a three-wheel pushcart.

FIG. 2 is a perspective view of the mounting bracket of the basket assembly of FIG. 1.

FIG. 3 is a perspective view of the clamp forming part of the mounting bracket of basket assembly.

Similar reference characters denote corresponding features consistently throughout the accompanying drawings.

DETAILED DESCRIPTION OF THE PREFERRED EMBODIMENT

Figure 4:
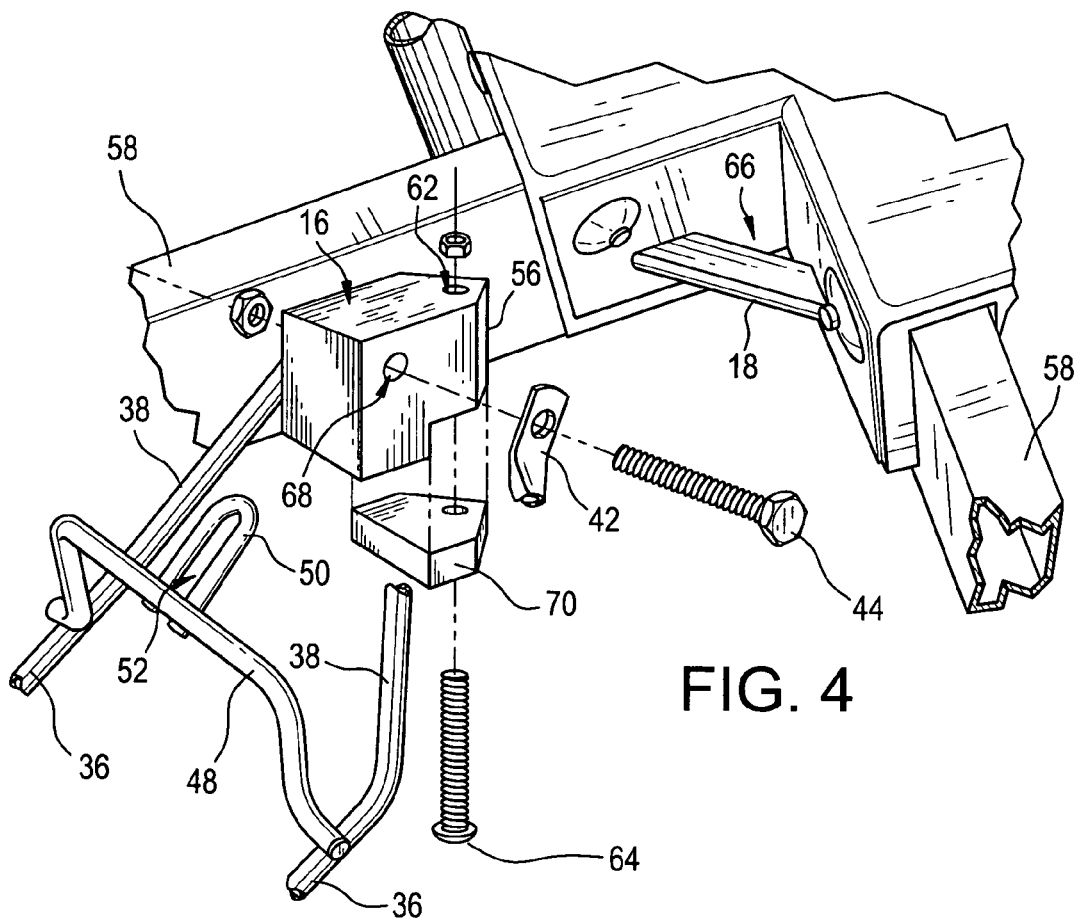
FIG. 4 is an exploded perspective view of the top of the mounting bracket of the basket assembly adjacent the leg brace of a three-wheel pushcart.
Figure 5:
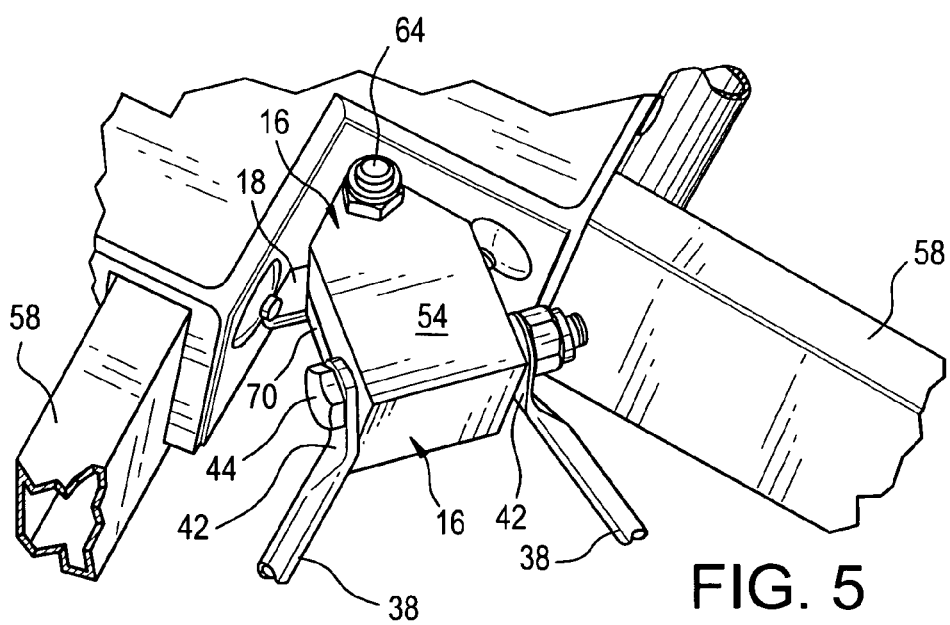
FIG. 5 is a perspective view of the top of the mounting bracket of the basket assembly secured to the leg brace of a three-wheel pushcart.

Referring now to the FIGS., a basket assembly in accordance with the present invention is shown at 10. Assembly 10 includes a basket 12 constructed as described in U.S. Pat. No. 6,079,600 that is incorporated by reference for all purposes herein. Basket 12 is releasably secured by a supporting bracket 14 and clamp 16 to the leg brace 18 of a three-wheel pushcart 20 constructed like those made and sold by Sun Mountain Sports.

Basket 12 is an openwork box 22 with a handle 24 pivotally secured by a pair of clips 26 to the top of box 22. Handle 24 includes a pair of side portions 28 joined by a cross portion 30. One of side portions 28 has an L-shaped end 32 that serves as a rotatable key for locking engagement with bracket 14.

Bracket 14 includes a pair of laterally spaced members 34 each having a lower segment 36 angularly joined to an upper segment 38. Lower segments 36 are positioned parallel to one another and are each provided with a forwardly facing hook 40 at its bottom. Upper segments 38, however, extend forwardly and inwardly from lower segments 36. The tops of the upper segments 38 are provided with a pair of parallel, apertured flanges 42 through which a threaded fastener 44 is extended to connect the upper end of bracket 14 to a clamp 16 grasping the leg brace 18 of cart 20.

Members 34 are connected at their bottoms by a first cross brace 46 and at their tops by a second cross brace 48. Cross brace 48 is affixed to lower segments 36 adjacent hooks 40. Cross brace 48, on the other hand, is affixed to lower segments 36 adjacent upper segments 38 and extends forwardly from lower segments 36. A locking member 50 is affixed to the center of cross brace 48 and extends upwardly and forwardly from it. Locking member 50 is U-shaped and defines a slot 52 for receiving the L-shaped end 32 of handle 24.

Clamp 16 includes a block 54 with a tapered rear end 56 for positioning between a pair of outstretched legs 58 of cart 20. A notch 60 is formed in the bottom of block 54 beneath rear end 56 that is sized to receive brace 18 that is a bar that connects and reinforces the tops of legs 58. A vertical bore 62 for receiving a threaded fastener 64 passes through tapered rear end 56 and intersects notch 60. The position of bore 62 is important and, to provide the strongest possible support for basket 12, must be located so that it can be axially aligned with the opening 66 bounded by brace 18 and legs 58. A horizontal bore 68 for the passage of threaded fastener 44 passes through the front end of block 54 and through the opposite sides of block 54.

A clamping plate 70 is secured to block 54 by means of threaded fastener 64 passing through a bore 72 therein. Like block 54, plate 70 is provided with a tapered rear end 74 for snug positioning between legs 58. Further, plate 70 is sized to capture brace 18 within notch 60 and drive brace 18 into tight engagement with block 54 whereby clamp 16 (hence bracket 14 and basket 12) is incapable of rotation about brace 18.

Use of the basket assembly 10 is straightforward. First, clamp 16 and bracket 14 are secured together by passing fastener 44 through bore 68 and apertured flanges 42 and, then, tightening fastener 44. Next, clamp 16 is positioned atop leg brace 18 with bore 62 and opening 66 in alignment. Finally, fastener 64 is extended through bores 62 and 72 and tightened to draw block 54 and clamping plate 70 together around brace 18. Bracket 14 and clamp 16 are now mounted on cart 20 and are ready to receive basket 12.

Basket 12 is easily positioned on bracket 14. First, the bottom of basket 12 is positioned within hooks 40 and the top of basket 12 is locked in place by passing L-shaped end 32 of handle 24 through locking member 50. Once done, handle 24 is rotated downwardly to a horizontal position against the top of basket 12 to twist L-shaped end 32 and lock basket 12 in place.

Basket 12 is removed from bracket 14 by reversing the steps detailed above—a process that requires mere seconds to complete. When disengaged, basket 12 can be lifted from the bracket 14 and carried away from cart 20. Basket assembly 10, therefore, permits detachment and reattachment of basket 12 to bracket 14 with a minimum of effort, tools and time.

While the preferred embodiment of the basket assembly has been described with a high degree of particularity, it will be appreciated by those skilled in the art that modifications can be made to it. Thus, it is to be understood that the present invention is not limited to the sole basket assembly described above, but encompasses any and all embodiments within the scope of the following claims.

I claim:

1. A basket assembly for use with a cart having a generally horizontal leg brace, comprising:
   a clamp for attachment to the leg brace of the cart, said clamp including:
      a block having a notch formed therein for receiving the leg brace, said block also having a first bore extending from the top to the bottom of said block and opening into said notch, and said block further having a second bore remote from said first bore and extending from one side of said block to the other side thereof;
      a first threaded fastener extending through said first bore;
      a second threaded fastener extending through said second bore; and,
      a clamping plate being secured to said block by said first threaded fastener;
   a supporting bracket being attached to said clamp, said supporting bracket including:
      a pair of laterally spaced members each having a lower segment, with a forwardly facing hook at its bottom, angularly joined to an upper segment with an apertured flange, through which said second threaded fastener extends, at its top;
      a cross brace connected to and extending between said laterally spaced members adjacent the connections between said lower and upper segments thereof;
      a locking member connected to said cross brace, said locking member having a slot formed therein; and,
   a basket releasably attached to said supporting bracket, said basket including:
      an openwork box having a bottom adapted for support by said forwardly facing hooks of said supporting bracket; and,
      a handle pivotally connected to said openwork box, said handle having an L-shaped end being insertable through said slot of said locking member when said handle is oriented in a first position whereby pivoting said handle to a second position pivots said L-shaped end to prevent its withdrawal from said slot and selectively locks said basket upon said supporting bracket.

2. A basket assembly for use with a cart having a generally horizontal leg brace, comprising:
   a clamp for attachment to the leg brace of the cart, said clamp including:
      a block having a tapered rear end and a notch formed in said block beneath said tapered rear end for receiving the leg brace, said block also having a first bore extending vertically through said tapered rear end and opening into said notch, and said block further having a second bore in the front end thereof and extending horizontally from one side of said block to the other side thereof;
      a first threaded fastener extending through said first bore;
      a second threaded fastener extending through said second bore; and, a clamping plate being secured to said block by said first threaded fastener;

a supporting bracket being attached to said clamp, said supporting bracket including:
- a pair of laterally spaced members each having a lower segment, with a forwardly facing hook at its bottom, angularly joined to an upper segment with an apertured flange, through which said second threaded fastener extends, at its top;
- a cross brace connected to and extending between said laterally spaced members adjacent the connections between said lower and upper segments thereof;
- a locking member connected to said cross brace, said locking member having a slot formed therein; and, a basket releasably attached to said supporting bracket, said basket including:
- an openwork box having a bottom adapted for support by said forwardly facing hooks of said supporting bracket;
- a handle pivotally connected to said openwork box, said handle having an L-shaped end being insertable through said slot of said locking member when said handle is oriented in a first position whereby pivoting said handle to a second position pivots said L-shaped end to prevent its withdrawal from said slot and selectively locks said basket upon said supporting bracket.

3. A basket assembly for use with a cart having a generally horizontal leg brace, comprising:

a clamp for attachment to the leg brace of the cart, said clamp including:
- a block having a tapered rear end and a notch formed in said block beneath said tapered rear end for receiving the top of the leg brace, said block also having a first bore extending vertically through said tapered rear end and opening into said notch, and said block further having a second bore in the front end thereof and extending horizontally from one side of said block to the other side thereof;
- a first threaded fastener extending through said first bore;
- a second threaded fastener extending through said second bore; and,
- a clamping plate for engagement with the bottom of the leg brace and being secured to said block by said first threaded fastener, said clamping plate being sized for reciprocating movement within said notch;

a supporting bracket being attached to said clamp, said supporting bracket including:
- a pair of laterally spaced members each having a lower segment, with a forwardly facing hook at its bottom, angularly joined to an upper segment with an apertured flange, through which said second threaded fastener extends, at its top;
- a cross brace connected to and extending between said laterally spaced members adjacent the connections between said lower and upper segments thereof;
- a locking member connected to said cross brace, said locking member having a slot formed therein; and, a basket releasably attached to said supporting bracket, said basket including:
- an openwork box having a bottom adapted for support by said forwardly facing hooks of said supporting bracket; and,
- a handle pivotally connected to said openwork box, said handle having an L-shaped end being insertable through said slot of said locking member when said handle is oriented in a first position whereby pivoting said handle to a second position pivots said L-shaped end to prevent its withdrawal from said slot and selectively locks said basket upon said supporting bracket.

* * * * *